United States Patent [19]

Urry

[11] Patent Number: 4,507,370
[45] Date of Patent: Mar. 26, 1985

[54] MINIATURE GALVANIC CELL CONSTRUCTION PROVIDING GAS CHANNELS BETWEEN ELECTRODE COMPARTMENTS

[75] Inventor: Lewis F. Urry, Columbia Station, Ohio

[73] Assignee: Union Carbide Corporation, Danbury, Conn.

[21] Appl. No.: 579,055

[22] Filed: Feb. 10, 1984

Related U.S. Application Data

[63] Continuation of Ser. No. 392,711, Jun. 28, 1982, abandoned.

[51] Int. Cl.³ .............................................. H01M 2/18
[52] U.S. Cl. ..................................... 429/142; 429/174
[58] Field of Search ................ 429/144, 145, 174, 142

[56] References Cited

U.S. PATENT DOCUMENTS 3,758,343 9/1973 Magritz ............................... 429/145
4,302,517 11/1981 Dziak ..................................... 429/66

Primary Examiner—Donald L. Walton
Attorney, Agent, or Firm—Cornelius F. O'Brien

[57] ABSTRACT

An improved miniature galvanic cell construction having a sealing gasket with channels defined through the base of the gasket. The channels provide means for the exchange of gaseous products around the cell separator and between the electrode compartments so as to reduce the overall internal pressure of the cell.

10 Claims, 10 Drawing Figures

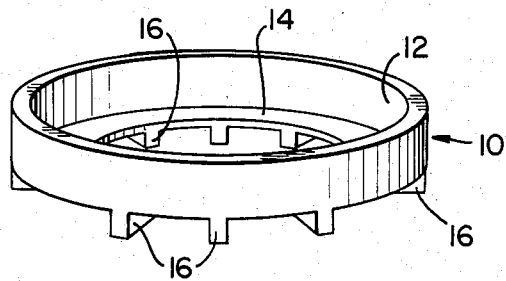
FIG. 4
FIG. 5
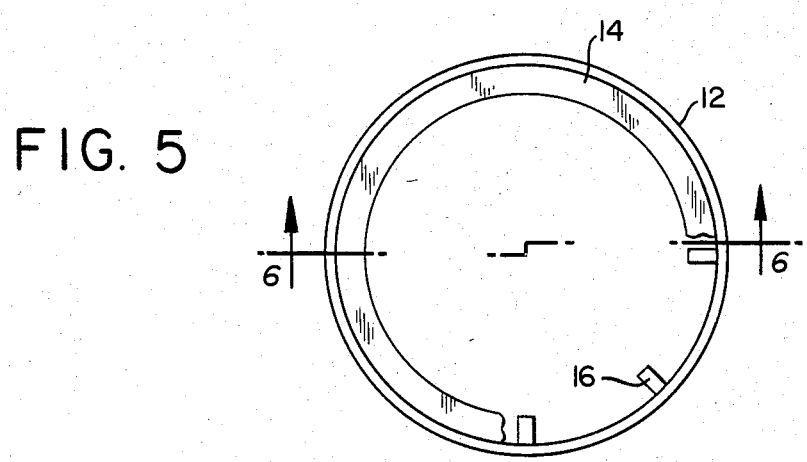
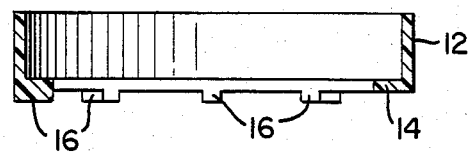
FIG. 6

MINIATURE GALVANIC CELL CONSTRUCTION PROVIDING GAS CHANNELS BETWEEN ELECTRODE COMPARTMENTS

This application is a continuation of prior U.S. application Ser. No. 392,711 filed 6/28/82, now abandoned.

DESCRIPTION

1. Technical Field

This invention relates to an improved miniature galvanic cell construction, specifically to a cell sealing gasket having channels defined through the base of the gasket, which channels provide for the passage of gaseous products around the cell separator layer and between the electrode compartments so as to reduce the overall internal pressure of the cell.

Applicant's copending U.S. patent application Ser. No. 392,662 filed herewith and entitled "Porous Annulus Providing Gas Channels Between Electrode Compartments" discloses a miniature galvanic cell wherein a porous annulus is disposed between the base of a sealing gasket and a cell separator so as to provide passageways around the separator and between the electrode compartments.

2. Background Art

Galvanic cells are a popular source of portable electrical energy. Miniature sealed galvanic cells supply the power for portable electronic devices such as radios, hearing aids, watches and calculators. Such a cell generally comprises a positive electrode, a negative electrode, a separator therebetween, and an electrolyte in ionic contact with the positive and negative electrodes, which components are housed in a container having a base, a sidewall and an open end and a cover over the open end of the container with an electrically insulating sealing gasket disposed and compressed between the container sidewall and the periphery of the cover. The base of the sealing gasket generally has a radially inwardly extending flange on which rests the peripheral edge of the cover. The separator generally does not extend so as to contact the container sidewall. When the cell is assembled the separator is compressed by the base of a sealing gasket from above and a rigid electrode or support ring from below, thereby sealing and separating the positive and negative electrode compartments.

Many liquid electrolytes used in galvanic cells will form a corrosive salt deposit on the exterior surface of the cell in which the electrolyte is used if the electrolyte leaks out of the cell. Such a corrosive deposit detracts from the appearance and marketability of the cell. These corrosive deposits may also damage the electronic device in which the cell is housed and short the cell. Therefore such galvanic cells are sealed to prevent electrolyte leakage.

A potential problem in certain types of sealed galvanic cells is that gaseous reaction products formed within the negative and positive electrode compartments may generate internal pressure. This pressure may build up and contribute to cell leakage and may cause the cell to distort or bulge. If the cell bulges, it may become wedged within the electronic device in which it is housed or may damage the device or may do both. If internal gas pressure is disproportionately generated in one electrode compartment that pressure will press the separator against the electrode having the lower internal pressure. The separator may compress the electrode having lower internal pressure and in doing so move so as to separate somewhat from the opposing electrode. This separation may raise the resistance of the cell, possibly to above acceptable operating limits.

Gas evolution, depending on the particular cell system used, may occur during cell storage, during normal discharge or charge activities, or during abusive discharge or charge conditions. In many cell systems, the gaseous products would further react with other cell components as by recombination so as to reduce the overall internal cell pressure if such other cell components were accessible. However, in many galvanic cells, the positive electrode and negative electrode compartments are physically isolated by a separator which, while not extending entirely to the container sidewall, is compressively sealed along its periphery between a cell insulating sealing gasket and a rigid electrode or support ring. The separator minimizes the migration of positive and negative electrode materials and also poses a barrier to the passage of gaseous products. Hence a gaseous product which is formed in the positive electrode compartment is effectively prevented from reaching the negative electrode compartment where it may further react so as to reduce the internal pressure of the cell. Likewise, gaseous products in the negative electrode compartment are estopped from reaching the positive electrode compartment in conventional cell designs.

It would be a significant contribution to the field of miniature sealed galvanic cells to provide means for exchanging gaseous products between the positive and negative electrode compartments of such cells so as to reduce internal cell pressure. Thus it is an object of this invention to provide means for exchanging gaseous products between the positive and negative electrode compartments of miniature sealed galvanic cells.

It is another object of this invention to provide a miniature cell construction that utilizes an electrically insulating sealing gasket which performs the dual function of providing the sealing means which is disposed and compressed between the container sidewall and the periphery of the cell cover while also providing exchange means between the positive and negative electrode compartments of the cell for the passage of gaseous products so as to reduce the overall internal pressure of the cell.

Another object of the present invention is to provide a gasket for miniature sealed galvanic cells having a sidewall portion which is disposed and compressed between the sidewall of the container and the periphery of the cover and a radially inwardly extending flange wherein the base of the gasket is provided with a plurality of spaced apart channels for the exchange of gaseous products between the positive and negative electrode compartments of a cell.

The foregoing and additional objects of this invention will become more fully apparent from the following description and accompanying drawings.

DISCLOSURE OF THE INVENTION

This invention relates to a sealed miniature galvanic cell comprising a housing having a container with a base, a sidewall and an open end, a cover disposed over the open end of the container and an electrically insulating sealing gasket compressively disposed between the container sidewall and the periphery of the cover, which housing contains a first electrode in electrical contact with the container, a second electrode in electrical contact with the cover, a separator interposed between the first and second electrodes and an electrolyte in ionic contact with the first and second electrodes; the improvement being a sealing gasket comprising a sidewall which is disposed and compressed between the sidewall of the container and the periphery of the cover and a radially inwardly extending flange, wherein the base of the sealing gasket has portions defining a plurality of channels which provide means for the exchange of gaseous products around the separator and between the first and second electrodes.

In accordance with the present invention a sealed assembled miniature galvanic cell is provided with a plurality of channels which extend through the base of the cell sealing gasket. The channels provide means for the exchange of gaseous products between the positive electrode compartment and the negative electrode compartment. The plurality of channels can be obtained by providing the cell sealing gasket with openings such as slots or grooves in its base or by providing projections in the base of the sealing gasket which will define a plurality of channels between the projections.

In accordance with the preferred embodiment of this invention, the electrically insulating sealing gasket is provided with longitudinal, radially spaced-apart channels, such as slots or grooves, in the base of the sealing gasket so as to form a plurality of channels. The channels are disposed across the base of the gasket flange and sidewall and extend past the periphery of the separator. The channels may partially or completely divide the gasket flange. Gaseous products may travel through the channels in the sealing gasket base and through the gap between the container sidewall and the separator layer to pass between electrode compartments. The channels may be tapered or otherwise narrowed so that the cross sectional area of a channel decreases in the base of the gasket sidewall so as to provide support and sealing surface area near the container sidewall. Gases which evolve in one electrode compartment may travel through these channels, avoiding the barrier posed by the gasket and separator interface and reaching the opposing electrode compartment where further reactions may occur which will reduce the internal cell pressure. The channels may be spaced at about 10° to about 90° intervals, preferably at about 45° to about 60° intervals.

Another embodiment of this invention comprises channels which pass through the upper surface of the sealing gasket flange and radially outwardly through the base of the sealing gasket, at or past the peripheral edge of the separator. The plurality of channels defined by this embodiment of the invention provides for the passage of gaseous products around the separator and between the negative electrode compartment and the positive electrode compartment.

Openings in accordance with the above described embodiments of the invention do not contribute to the overall height of the cell, an important consideration in the design of fixed-height miniature galvanic cells.

An alternative embodiment of this invention provides the base of the gasket with a plurality of circumferentially spaced-apart longitudinal projections, which when compressed against the separator layer in an assembled cell define a channel between each adjacent projection thus providing an overall plurality of spaced apart channels for the passage of gaseous products around the separator and between the negative and positive electrode compartments. The longitudinal projections are spaced circumferentially around the base of the gasket at about 10° to about 90° intervals, preferably at about 45° to about 60° intervals. The projections in accordance with this embodiment of the invention have a height of from about 0.003 inch (0.008 cm) to about 0.010 inch (0.025 cm) for miniature galvanic cells of 0.5 inch (1.27 cm) and smaller in height. The height of these projections contribute to the overall height of the miniature cell and must be considered in the design of miniature cells, especially fixed-height miniature cells.

Each of the plurality of openings defined in the base of the sealing gaskets of the previously described embodiments could assume any configuration such as rectangular, circular, semi-circular, square or any polygonal or irregular shape or combination thereof.

The channels defined in accordance with this invention may remain void or may be filled with a material so long as the channels remain sufficiently porous and do not impede the passage of gaseous products therethrough. Under the physical conditions which exist within miniature cells wherein the cell system is damp but not flooded with electrolyte, the channels formed in accordance with this invention will remain free of liquid and so will not furnish a free ion path between the negative and positive electrode compartments which would negate the function of the separator.

An additional benefit which is realized by having channels that bridge between the negative electrode compartment and the positive electrode compartment is that liquid electrolyte can be rapidly passed through such channels thereby simplifying and facilitating the assembly of miniature galvanic cells since the electrolyte need only be introduced into one electrode compartment.

The particular number of openings and the cross sectional area of each opening will depend primarily on the cell system to be housed within the container and by the reaction products that are produced by the active electrode components of the cell system.

The electrically insulating sealing gasket of this invention has to be stable in the presence of electrolyte and other cell components and may be selected from such materials as fluorocarbons such as polytetrafluoroethylene, fluorinated ethylene-propylene polymer, ethylene copolymer with fluorinated ethylene-propylene polymer, polychlorotrifluoroethylene, and perfluoroalkoxy polymer; polyvinyl; polyethylene; polypropylene; polystyrene; nylon and other materials which are well known to those skilled in the art. Some of the above materials, however, may be wetted by electrolytes. If so, it is preferred to apply a nonwetting agent to the gasket which discourages electrolyte travel especially along the surfaces of the channels in the sealing gasket and through the interface between the container and the gasket sidewall. Such a nonwetting agent may be a fatty polyamide resin, a polymeric silicone or asphalt. A preferred nonwetting agent is dependent on the electrolyte used in the cell.

The cell container and cover may be made of stainless steel, iron, nickel, monel, nickel-plated steel, copper clad steel, or some other conductive material that will not corrode or otherwise deteriorate when in contact with the cell components.

The separator for use in this invention has to be chemically inert and insoluble in the cell system and permit ion transfer between the negative and positive electrodes.

The above described embodiments of this invention which provide openings between the negative electrode compartment and the positive electrode compartment of a miniature cell are particularly preferable for miniature aqueous alkaline silver oxide/zinc cells that are known to generate gaseous products during storage. Hydrogen gas is known to form in the negative electrode compartment which contains zinc in monovalent and divalent silver oxide/zinc cells. If the hydrogen is permitted to migrate to the positive electrode compartment which contains silver oxide it will combine slowly with the electrolyte-wetted silver oxides. Also, oxygen gas can be formed by the decomposition of divalent silver oxide. If the oxygen can reach the opposing compartment of the cell it will combine readily with zinc that is wet with alkaline electrolyte. These reactions reduce the internal pressure in the cell and prevent leakage or bulging of the cell.

BRIEF DESCRIPTION OF DRAWINGS

The present invention will become apparent from the following description thereof when considered together with the accompanying drawings which are set forth as being exemplary of embodiments of the present invention and are not intended, in any way, to be limitative thereof and wherein:

FIG. 4 is a perspective view of another embodiment of a seal and gas exchange gasket for use in miniature galvanic cells in accordance with this invention wherein channels are provided between adjacent projections which extend from the base of the gasket;

FIG. 5 is a plan view partially broken away of the seal and gas exchange gasket of FIG. 4;

FIG. 6 is a sectional elevational view of the seal and gas exchange gasket of FIG. 5 taken through line 6—6;

DETAILED DESCRIPTION OF DRAWINGS

Figure 1:
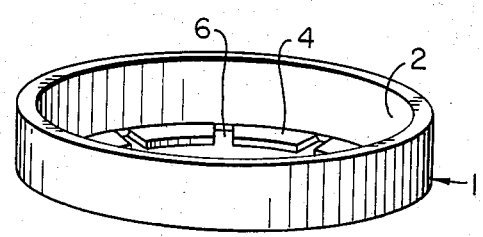
FIG. 1 is a perspective view of one embodiment of a seal and gas exchange gasket for use in a miniature galvanic cell in accordance with this invention wherein channels are provided across the base of the gasket.
Figure 2:
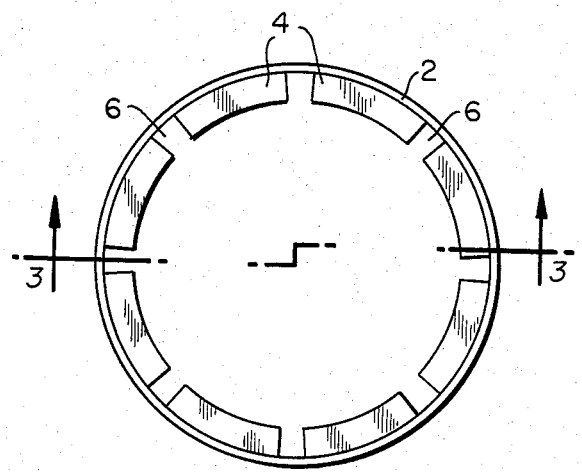
FIG. 2 is a plan view of the seal and gas exchange gasket of FIG. 1.
Figure 3:
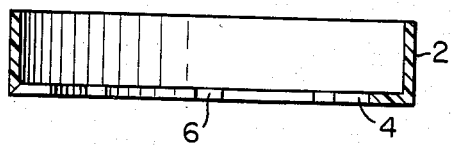
FIG. 3 is a sectional elevational view of the seal and gas exchange gasket of FIG. 2 taken through line 3—3.
Figure 10:
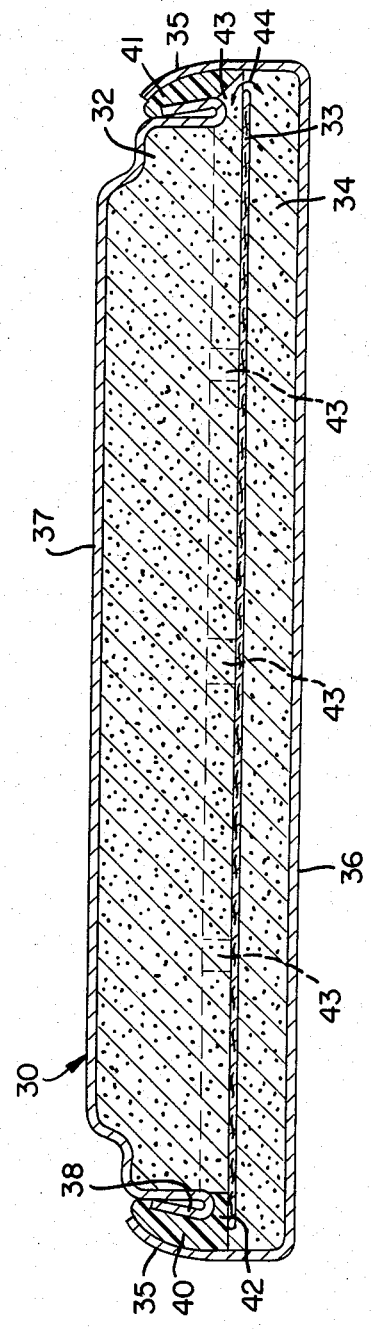
FIG. 10 is a sectional elevational view taken through an assembled miniature galvanic cell showing the seal and gas exchange gasket of FIG. 1 assembled in a cell.

Referring to FIGS. 1 through 3, there is shown a seal and gas exchange gasket 1 comprising a vertical sidewall 2 adapted to be disposed and compressed between the sidewall of a container and the edge of a cover, and a radially inwardly disposed flange 4 onto which the peripheral edge of the cover can rest. Disposed circumferentially inwardly along the gasket flange 4 are spaced-apart channels 6 at 45° spacings. Each channel is shown tapered through the base of sidewall 2 as can be seen in FIG. 3, although it is not necessary that the channel be tapered. The spaced channels in the sealing gasket, as will be discussed below in conjunction with FIG. 10, provide means for the exchange of gases between the positive and negative electrode compartments. The channels shown in FIGS. 1 through 3 completely divide the flange 4. Channels could also be provided which would extend along the base of the gasket sidewall and the base of the flange without dividing the flange. Additionally, the opening could have any cross sectional shape.

FIGS. 4 through 6 show another embodiment of a seal and gas exchange gasket 10 for a miniature cell having a vertical sidewall 12 adapted to be disposed and compressed between the sidewall of a container and the periphery of a cover and a radially inwardly extending flange 14. Beneath the base of the gasket sidewall 12 and flange 14 are longitudinal projections 16 shown spaced apart at 45° intervals. The projections 16 are intended to rest on the separator. When a cell is assembled the projections maintain channels between each adjacent projection which provide gas communication between the negative and positive electrode compartments.

Figure 7:
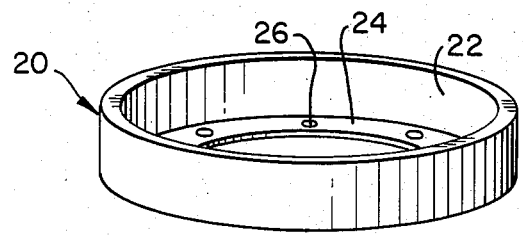
FIG. 7 is a perspective view of another embodiment of a seal and gas exchange gasket for use in miniature galvanic cells in accordance with this invention wherein channels are provided through the flange of the gasket.
Figure 8:
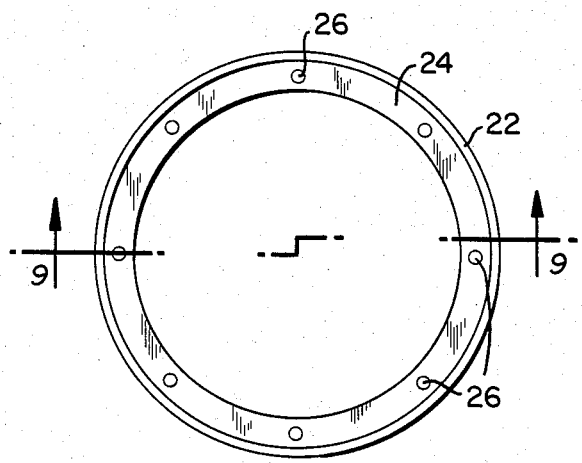
FIG. 8 is a plan view of the seal and gas exchange gasket of FIG. 7.
Figure 9:
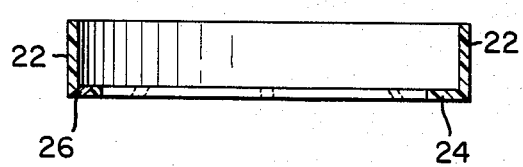
FIG. 9 is a sectional elevational view of the seal and gas exchange gasket of FIG. 7 taken through line 9—9.

Referring to FIGS. 7 through 9, there is shown another embodiment of a seal and gas exchange gasket 20 having a sidewall 22 and a radially inwardly extending flange 24. A plurality of channels is provided in seal 20 which are circumferentially spaced-apart channels 26 shown spaced at 45° intervals. The channels 26 provide passageways for the exchange of gases between the negative and positive electrode compartments and are disposed through the gasket flange 24, passing through the upper surface of the flange 24 and radially outwardly through the base of the gasket 20.

Referring to FIG. 10, there is shown an assembled sectional elevational view of a typical miniature cell designated by the number 30 having a sealing gasket as in FIG. 1. The cell 30 comprises a negative electrode 32, a separator 33 and a positive electrode 34 housed in container 36 and cover 37. As shown in FIG. 10, the separator 33 does not extend completely across the container 36 as to contact the container sidewall 35 so that the periphery of the positive electrode 34 is not covered by the separator 33. Disposed between the container sidewall 35 and the cover periphery 38 is a seal and gas exchange gasket 40 of the type shown in FIG. 1. Specifically, the seal and gas exchange gasket 40 comprises a sidewall 41 which is disposed and compressed between the sidewall 35 of container 36 and the U-shaped periphery 38 of cover 37. Extending inward from the base of the gasket sidewall 40 is a flange 42. Channels in the form of slots 43 are radially disposed at 45° spacings through the flange 42 (some of which are shown in dotted outline). The slots 43 are shown tapered as they pass through the base of the gasket sidewall 41. As gaseous products evolve in either the negative electrode 32 or the positive electrode 34 the gases can migrate around the separator 33 to the opposing electrode compartment by means of the channels 43 provided by the seal and gas exchange gasket 40, which migration path is designated by an arrow 44 in FIG. 10.

It is to be understood that modifications and changes to the preferred embodiment of the invention herein shown and described can be made without departing from the spirit and scope of the invention.

I claim:

1. A sealed miniature galvanic cell comprising a housing having a container with a base, a sidewall and an open end, a cover disposed over the open end of the container and an electrically insulating sealing gasket compressively disposed between the container sidewall and the periphery of the cover, which housing contains a first electrode in electrical contact with the container, a second electrode in electrical contact with the cover, a separator interposed between the first and second electrodes and an electrolyte in ionic contact with the first and second electrodes, said sealing gasket comprising a base and a sidewall, which sidewall of the sealing gasket is disposed and compressed between the sidewall of said container and the periphery of said cover and which base comprises a radially inwardly extending flange, which flange is in contact with said separator; the improvement wherein the base of said sealing gasket defines a plurality of channels which extend past the periphery of the separator and which provide means for the exchange of gaseous products around said separator and between the first and second electrodes.

2. The sealed miniature glavanic cell in accordance with claim 1 wherein said plurality of channels in the base of said sealing gasket comprises longitudinal, radially spaced-apart channels across the base of said sealing gasket.

3. The sealed miniature galvanic cell in accordance with claim 1 wherein said plurality of channels in the base of said sealing gasket comprises channels which pass through the upper surface of said gasket flange and radially outwardly through the base of said sealing gasket.

4. The sealed miniature galvanic cell in accordance with claim 2 or 3 wherein said channels are spaced apart at intervals of from about 10° to about 90°.

5. The sealed miniature galvanic cell in accordance with claims 2 or 3 wherein said channels are spaced apart at intervals of from about 45° to about 60°.

6. The sealed miniature galvanic cell of claim 1 wherein the base of said sealing gasket has a plurality of spaced-apart longitudinal projections which provide channels between adjacent projections so as to define the plurality of channels in the base of said sealing gasket.

7. The sealing gasket in accordance with claim 6 wherein said longitudinal projections are spaced apart at intervals of from about 10° to about 90°.

8. The sealing gasket in accordance with claim 6 wherein said longitudinal projections are spaced apart at intervals of from about 45° to about 60°.

9. The sealed miniature galvanic cell in accordance with claim 1 wherein said electrolyte is an alkaline electrolyte.

10. The sealed miniature galvanic cell in accordance with claim 1 or 9 wherein said positive electrode comprises silver oxide and said negative electrode comprises zinc.

* * * * *